United States Patent
Kanade et al.

(10) Patent No.: US 8,390,671 B2
(45) Date of Patent: Mar. 5, 2013

(54) DISPLAY WITH GAPS FOR CAPTURING IMAGES

(75) Inventors: Udayan Kanade, Pune (IN); Balaji Ganapathy, Pune (IN)

(73) Assignee: I2iC Corporation, Foster City, CA (US)

( * ) Notice: Subject to any disclaimer, the term of this patent is extended or adjusted under 35 U.S.C. 154(b) by 1041 days.

(21) Appl. No.: 12/302,313

(22) PCT Filed: May 25, 2007

(86) PCT No.: PCT/IB2007/051992
§ 371 (c)(1),
(2), (4) Date: Nov. 25, 2008

(87) PCT Pub. No.: WO2007/138543
PCT Pub. Date: Dec. 6, 2007

(65) Prior Publication Data
US 2009/0141116 A1 Jun. 4, 2009

(30) Foreign Application Priority Data
May 25, 2006 (IN) .......................... 795/MUM/2006

(51) Int. Cl.
*H04N 7/14* (2006.01)

(52) U.S. Cl. ................. 348/14.16; 340/14.01; 340/14.08
(58) Field of Classification Search ................. 348/14.1, 348/14.16, 14.08
See application file for complete search history.

(56) References Cited

U.S. PATENT DOCUMENTS

| 5,159,445 | A | * | 10/1992 | Gitlin et al. ................. 348/14.01 |
| 6,454,414 | B1 | | 9/2002 | Ting |
| 6,861,121 | B2 | * | 3/2005 | Matsunaga et al. ........... 428/141 |
| 2005/0001537 | A1 | * | 1/2005 | West et al. ................... 313/500 |
| 2007/0002130 | A1 | | 1/2007 | Hartkop |

FOREIGN PATENT DOCUMENTS

EP 0385128 A2 9/1990

OTHER PUBLICATIONS

IB 2007/051992, Dec. 18, 2007, PCT International Search Report.

* cited by examiner

*Primary Examiner* — Melur Ramakrishnaiah

(57) ABSTRACT

A combined video display and camera system is disclosed. According to an embodiment of the present invention, the system comprises a video display with gaps in between the pixels. Light goes through these gaps and enters a camera, which captures an image. The system is arranged such that the display and the gaps are optically out of focus with respect to the camera.

10 Claims, 12 Drawing Sheets

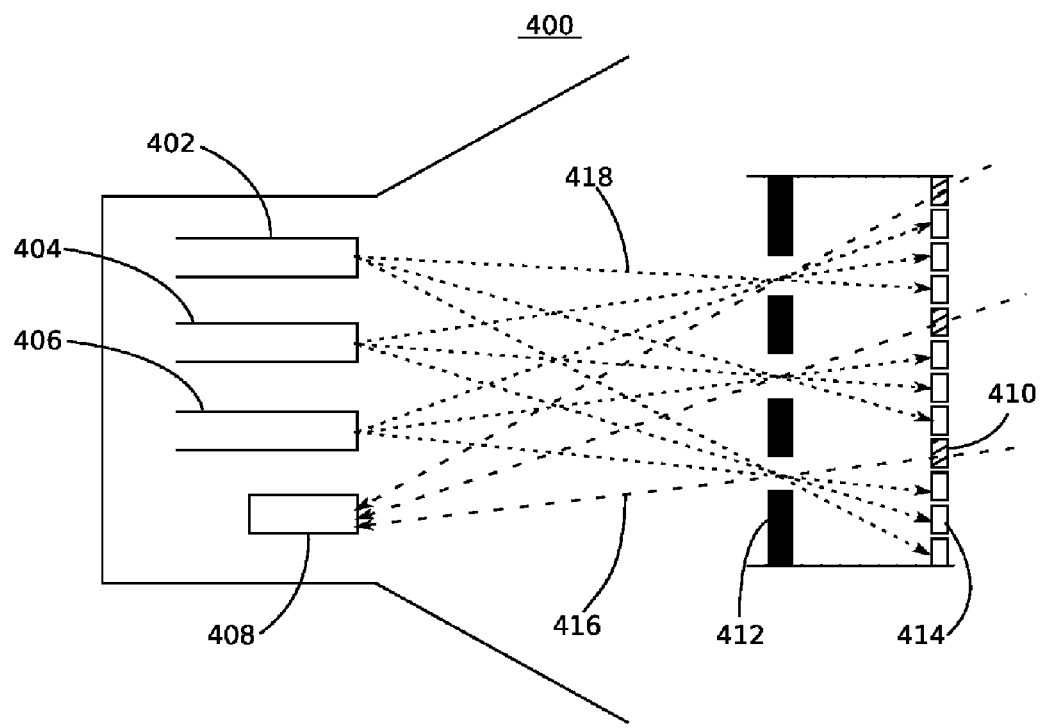
FIG 4A
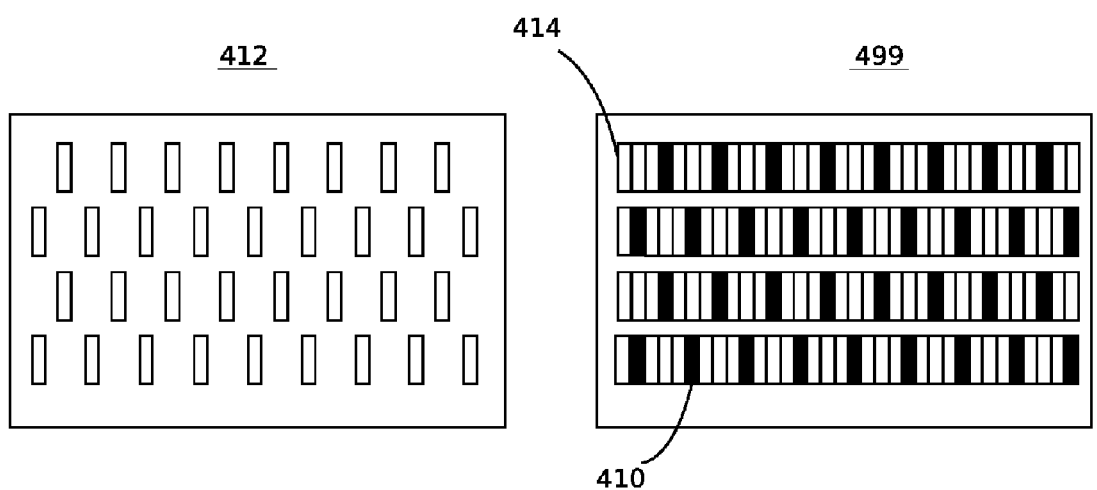
FIG 4B  FIG 4C

DISPLAY WITH GAPS FOR CAPTURING IMAGES

The present application claims the benefit of and priority to Indian Provisional Patent Application No. 795/MUM/2006 entitled "A Display with Holes for Capturing Images" and filed on May 25, 2006.

FIELD OF INVENTION

The present invention relates to displays. More particularly, the invention relates to a combined video display and camera system.

BACKGROUND

In video conferencing, two people communicate audio-visually. Each person is near a video conferencing terminal having a video display and a camera. The camera captures the image of the person, which is transmitted to the distant person. The image of the distant person is depicted on the display. Each person in the video conference is looking at his or her display. The camera is placed near the display. Since the user is looking at the display, the image captured by the camera is of the person looking away from the camera. Each person, is therefore, unable to maintain eye contact. Absence of eye contact during a conversation greatly reduces the effectiveness of communication.

Many prior art systems use two way mirror, also called half silvered mirror or beam splitter. A two-way mirror simultaneously reflects some light and passes some light.

FIG. 21 illustrates a prior art video conferencing system. A conferee 2102 views the display 2108 reflected in mirror 2104 while camera 2106 captures images of the conferee 2102. The image is captured from the same position that the conferee 2102 is looking at. Teleprompters function this way.

Another prior art video conferencing system uses a terminal equipped with beam splitter for reflecting an image generated by video display so that only the reflection and not a direct view of the display is seen by the conferee. The camera is positioned behind the viewing side of the beam splitter to capture the conferee's image through the beam splitter. The direct view of the display is blocked by an image blocking an image blocking film applied between the beam splitter and the display. Blocking the direct view of the video display greatly improves teleconferencing by eliminating the distraction of simultaneously viewing both the video display and the reflection of the display.

Prior art systems are quite bulky, especially when compared to modern display systems or modern teleconferencing systems. These systems waste a lot of energy, since a large amount of energy radiated by the displays is wasted since it goes through the two way mirror.

Many prior art systems compute a three-dimensional model of the conferee. Then the model is used to render an image of the conferee as if a camera were placed just behind the screen. The three-dimensional model is computed from multiple views of the conferee captured by cameras near the display, or by illuminating the conferee using light of a particular known pattern, and using the data pertaining to the illumination caused by the light.

In another prior art system, the three-dimensional model is not computed, but the final virtual view from the direction of the display is estimated by visual flow interpolation techniques. All these methods are computationally expensive. Furthermore, they do not perfectly capture the required image, but just estimate it. Also, the closer the viewer is to the display, the larger the disparity between the images captured by the various cameras, and harder it is to compute an accurate three-dimensional model of the conferee. Also, such approximation models falter under improper lighting conditions and improper viewing conditions such as presence of particulate matter or obstructions.

A prior art method for achieving eye-contact in a video conferencing situation uses a camera placed directly in the line of sight between the conferee and the display. Though a correct image of the user may be captured this way, the visual obstruction of the camera is not comfortable to the conferee.

An attachment mechanism removably secures the camera to a screen portion of a display screen such that the camera is disposed between the display screen and the conferee. The attachment mechanism can be a suction cup, strips of double-sided tape, or magnets. Magnetic force between the first and the second magnets removably secures the camera to a screen portion of the flat panel display.

Other prior art systems use projection systems and are bulky in nature. Furthermore, these systems do not offer complete isolation of the camera sensor from the light due to the display, causing unwanted glare. Also, in many situations flat panel displays are preferred to projection systems due to image quality reasons.

A typical display is made of a number of picture elements called pixels. In a transmissive display, a backlight is present behind the sheet of pixels. The backlight is illuminated by the light source along one or more of its edges. The backlight disperses the light into the pixels. Depending on the state of the pixels, the pixels emit light of different intensity.

A cathode-ray tube is used for displaying pictures and video on displays such as televisions, computer monitors etc. A cathode-ray tube has separate electron guns for different colors which are the sources of electrons. The electrons are directed to fall on a florescent screen, which causes the screen to emit light. Each electron gun is supposed to direct light only on a portion of display screen. Shadow masks and aperture grilles are provided to ensure that electrons from one electron gun do not fall on the portions of the display corresponding to other electron guns.

A plasma display is used widely for large television screens. The display is made of plasma pixels such that each plasma pixel consists of inert gases held between two plates. By directing high voltage across the pixel, the gas inside the pixel is converted to plasma state. This triggers the phosphor and light is emitted. Organic light emitting diodes (OLEDs) based displays are currently used in small-sized displays such as mobiles, personal digital assistants etc. OLEDs are light emitting diodes having an organic layer as a light emissive cathode layer. When the diode is forward biased, there is recombination of holes and electrons at the junction between the organic layer and the inorganic conductive layer. This recombination causes radiation in the visible region.

A liquid crystal display is one the most widely used displays today. The liquid crystal display is a transmissive display having a backlight, dispersing light from the light source into the liquid crystal sheet. The liquid crystal sheet itself is sandwiched between two polarizer sheets. The liquid crystal sheet comprises tiny liquid crystal cells forming pixels of the display. Depending on the electric voltage applied, the state of the liquid crystal changes. The light entering each cell is polarized by the first polarizer sheet and depending on the state of the liquid crystal, the polarization of the light going into the second polarizer sheet is modified. Hence, the intensity of light coming out of the sheet is controlled by the voltage applied across the liquid crystal. The pixel is black when the liquid crystal is in such a polarization state that the second polarizer blocks all the light coming from the liquid crystal. The pixel is white when the liquid crystal is in such a polarization state that the second polarizer allows all the light coming from the liquid crystal. By varying the voltage across the liquid crystal the pixel gray level intensity is changed. For many liquid crystals, the transition of the intensity of the pixel from one gray level to another is slow if the voltage difference required to make the transition is small. On the other hand, the transition of the intensity of pixel from white to black or black to white is faster as the voltage difference is larger.

SUMMARY

A combined video display and camera system is disclosed. In an embodiment, the system comprises a display panel comprising gaps in between the pixels. At least one camera is placed behind the display panel so as to capture an image through the gaps in the display panel.

The above and other preferred features, including various details of the implementation and combination of elements are more particularly described with reference to accompanying drawings and pointed out in the claims. It is understood that the embodiments described herein are for purpose of elucidation and should not be limiting the subject matter of the present patent. Various modifications, uses, substitutions, recombinations, improvements, methods or productions without departing from the scope or spirit of the present invention would be evident to a person skilled in the art.

BRIEF DESCRIPTION OF THE DRAWINGS

FIG. 4A illustrates a block diagram of a combined cathode ray tube video display with shadow mask and camera system, according to an embodiment of the present invention.

FIG. 4B illustrates a block diagram of an exemplary shadow mask, according to an embodiment of the present invention.

FIG. 4C illustrates a block diagram of an exemplary display with phosphors and gaps provided in the same plane, according to an embodiment of the present invention.

DETAILED DESCRIPTION

A combined video display and camera system is disclosed. according to an embodiment of the present invention, the system comprises a video display with gaps in between the pixels. Light goes through these gaps and enters a camera, which captures an image. The system is arranged such that the display and the gaps are optically out of focus with respect to the camera.

Figure 1:
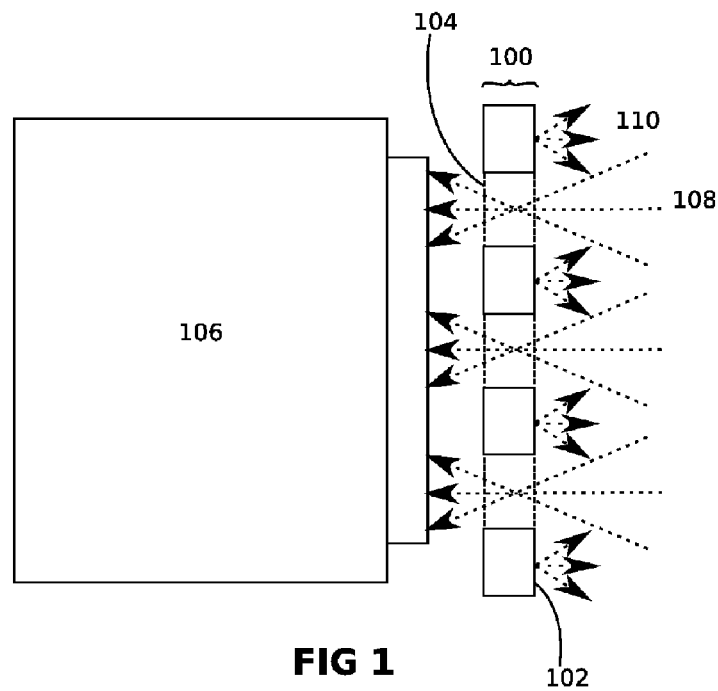
FIG. 1 illustrates a block diagram of a combined video display and camera system, according to an embodiment of the present invention.

FIG. 1 illustrates a block diagram of a combined video display and camera system 199, according to an embodiment of the present invention. An image is displayed on the video display 100. Light 110 emanates from the display 100 and reaches the user. The display 100 comprises pixels 102 and gaps 104. Light 108 goes through gaps 104 and enters camera 106, which captures an image. The system is arranged such that the display 100 is out of focus with respect to the camera. According to an embodiment of the present invention, pixels 102 are light emitting devices such as light emitting diodes, organic light emitting diodes or plasma pixels.

According to an embodiment of the present invention, the gaps 104 in the display 100 are of a size such that individual gaps are not visible to the naked eye from normal viewing distance.

According to an embodiment of the present invention, the camera 106 captures an image during a capture period, when the display 100 does not display any image. The video display 100 displays an image during a display period when the camera 106 does not capture any image. This alternation of the display and the capture periods ensure that light rays 110 from the display do not affect the image captured by the camera 106. This alternation of the display and capture periods is so fast that the eye of the user does perceive the flicker.

Figure 2:
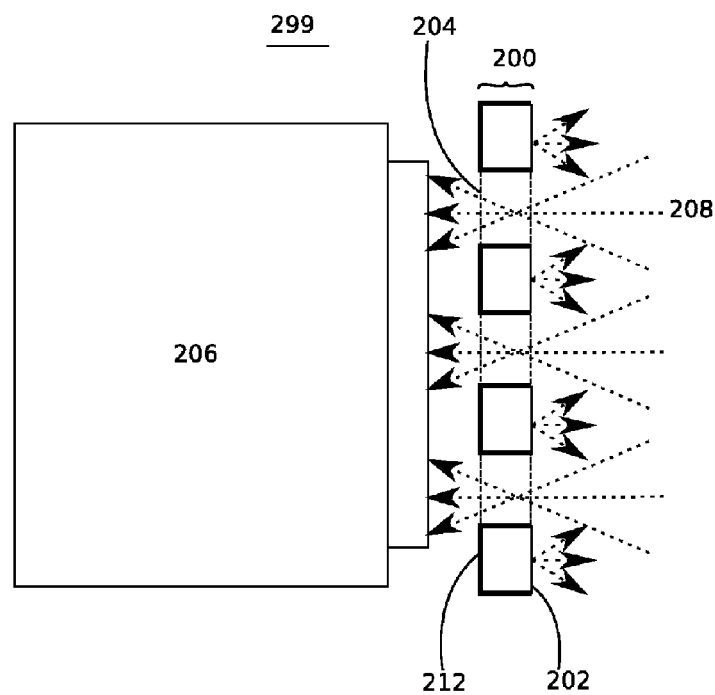
FIG. 2 illustrates a block diagram of a combined video display and camera system, with light barriers around each pixel, according to an embodiment of the present invention.

FIG. 2 illustrates a block diagram of a combined video display and camera system 299, with light barriers around each pixel, according to an embodiment of the present invention. Light barriers 212 block light from pixels 202 from entering camera 206. Light barriers 212 are made out of light absorbing material. In an alternate embodiment, light barriers 212 reflect light of the pixels 202 such that it emanates in the direction of the user.

Figure 3:
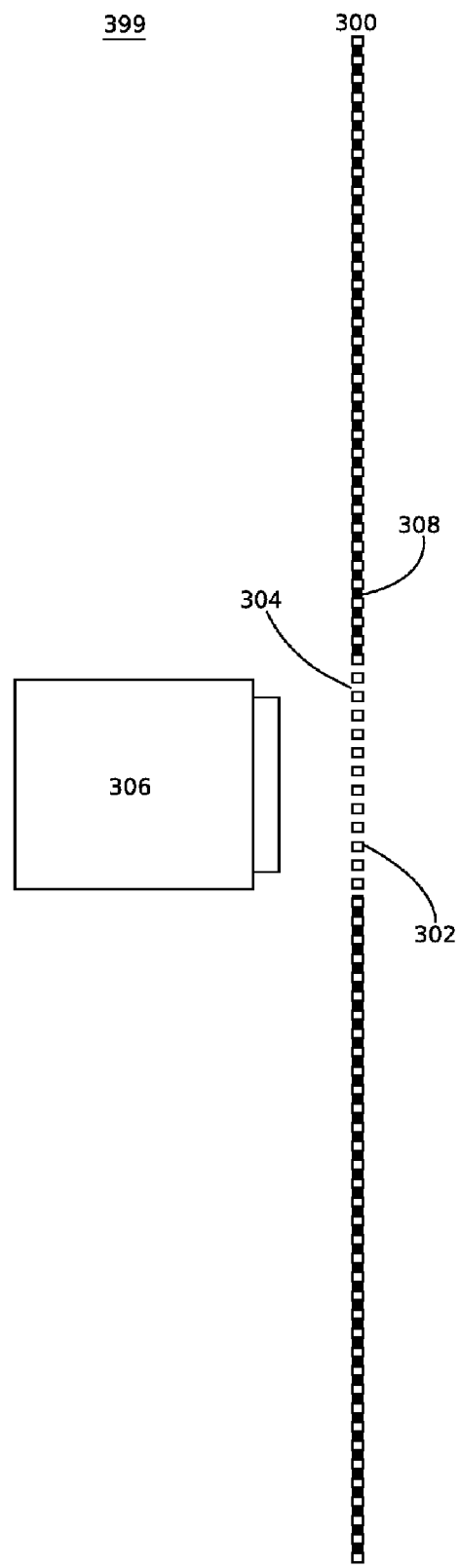
FIG. 3 illustrates a block diagram of a combined video display and camera system, according to an embodiment of the present invention.

FIG. 3 illustrates a block diagram of a combined video display and camera system 399, according to an embodiment of the present invention. The display 300 is made of pixels 302, gaps 304 and black dots 308. The gaps 304 are present only in front of the camera 306. Black dots 308 are provided in place of gaps 304 at locations through which camera may not capture an image.

FIG. 4A illustrates a block diagram of a combined cathode ray tube video display with shadow mask and camera system 400, according to an embodiment of the present invention. Electron beam sources 402, 404 and 406 source electron beams 418 which go through shadow mask 412 to fall on appropriately colored phosphors 414. Light 416 goes through gaps 410 situated in the plane of the phosphors 414, then goes through the shadow mask 412 to enter the camera 408. In an embodiment, shadow mask 412 blocks most of the light emanating from phosphors 414 from entering the camera 408.

FIG. 4B illustrates a block diagram of an exemplary shadow mask 412, according to an embodiment of the present invention.

FIG. 4C illustrates a block diagram of an exemplary display with phosphors and gaps provided in the same plane 499, according to an embodiment of the present invention. Gaps 410 and phosphors 414 are situated in the plane 499.

Figure 5A:
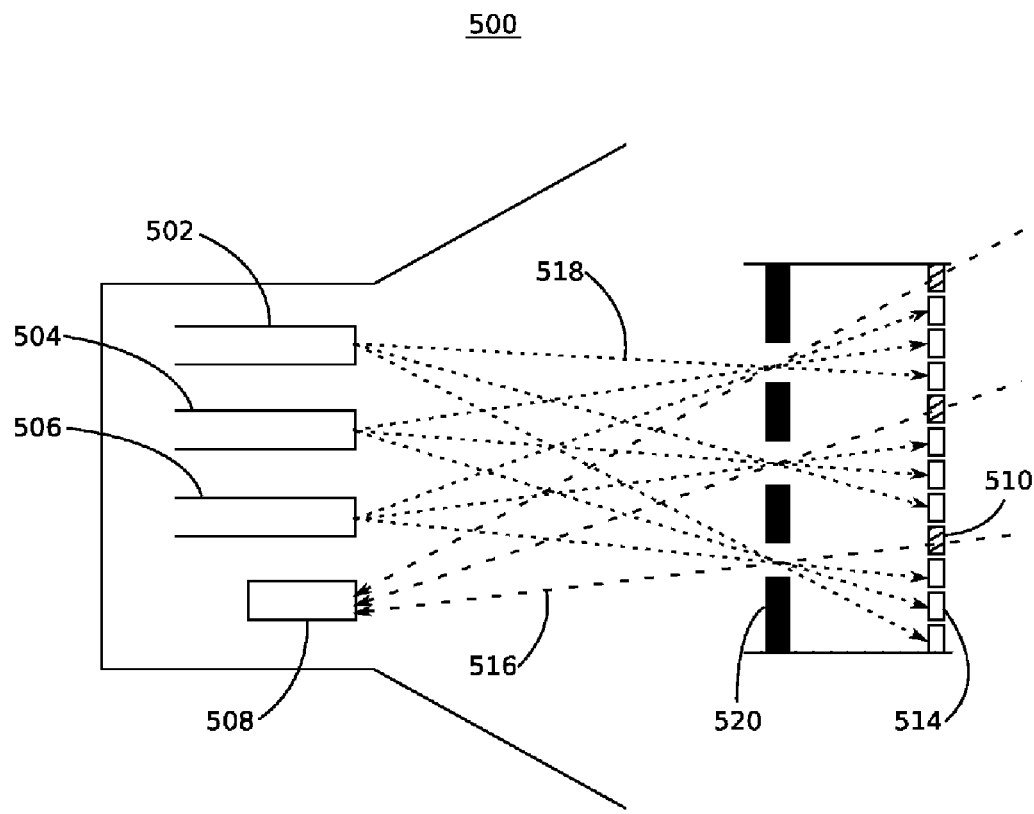
FIG. 5A illustrates a block diagram of a combined cathode ray tube video display with aperture grilles and camera system, according to an embodiment of the present invention.

FIG. 5A illustrates a block diagram of a combined cathode ray tube video display with aperture grilles and camera system 500, according to an embodiment of the present invention. Electron beam sources 502, 504 and 506 source electron beams 518 which go through aperture grille 520 to fall on appropriately colored phosphors 514. Light 516 goes through gaps 510 situated in the plane of the phosphors 514, then goes through the aperture grille 520 to enter the camera 508. In an embodiment, aperture grille 520 blocks most of the light emanating from phosphors 514 from entering the camera 508.

Figure 5B:
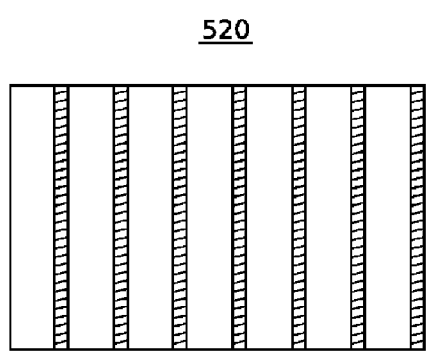
FIG. 5B illustrates a block diagram of an exemplary aperture grille, according to an embodiment of the present invention.

FIG. 5B illustrates a block diagram of an exemplary aperture grille 520, according to an embodiment of the present invention.

Figure 5C:
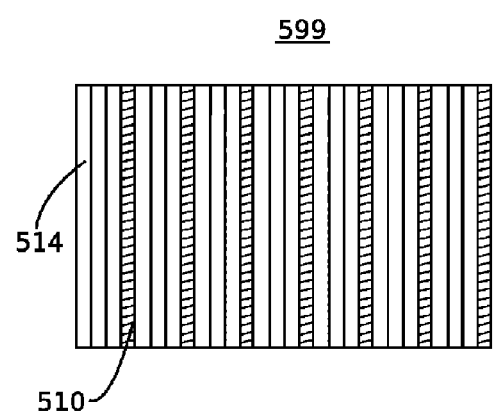
FIG. 5C illustrates a block diagram of an exemplary display with phosphors and gaps provided in the same plane, according to an embodiment of the present invention.

FIG. 5C illustrates a block diagram of an exemplary display with phosphors and gaps provided in the same plane 599, according to an embodiment of the present invention. Gaps 510 and phosphors 514 are situated in the plane 599.

Figure 6:
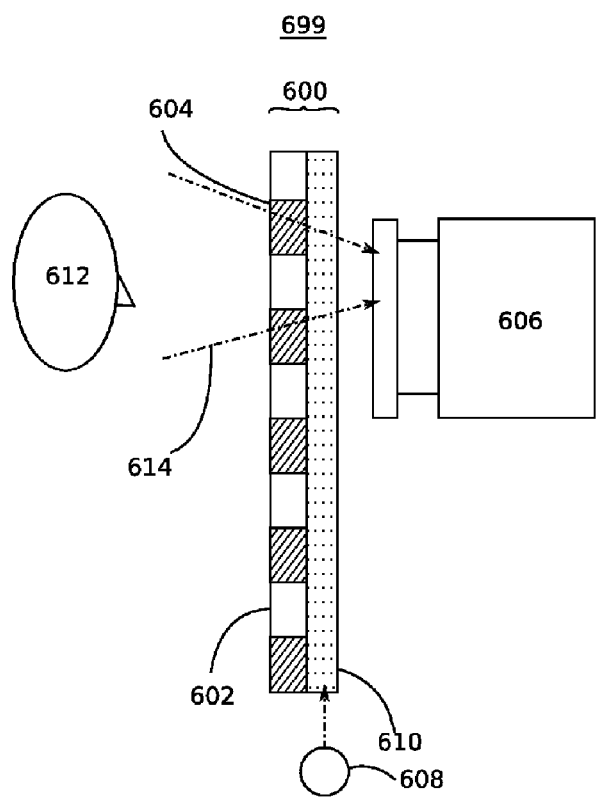
FIG. 6 illustrates a block diagram of a combined transmissive video display and camera system, according to an embodiment of the present invention.

FIG. 6 illustrates a block diagram of a combined transmissive video display and camera system 699, according to an embodiment of the present invention. The transmissive video display 600 depicts an image by adjusting the optical transparency of its pixels 602. Backlight 610 is used for illuminating the screen by diffusing light from light source 608 such that light passes through the transmissive display 600 to user 612 who sees the picture. Camera 606 captures an image of the user 612 through the gaps 604 provided in the display 600 and the backlight 610.

In an embodiment, system 699 has different periods of time for capturing an image and displaying a picture, by alternating the display period and the capture period. The alternation between the display and capture periods is so fast that the eye of the user 612 is not able to perceive the flicker. This is achieved by switching the light source 608 on and off. When the light source 608 is on, the backlight 610 emanates light. In an embodiment, the camera 606 is not capturing an image when light source 608 is on. When the light source 608 is off, the backlight 610 does not emanate light, but passes light through it. Light 614 goes through gap 604 and backlight 610 and enters the camera 606, which captures an image.

In an embodiment, gaps 604 in the transmissive display 600 are made opaque during the time period that light source 608 is on. This may be achieved by constructing the gaps 604 in a similar manner to other pixels 602 of the transmissive display 600, and making the gaps 604 opaque. In an embodiment, both the pixels 602 and the gaps 604 are pixels of an LCD display. The gaps 604 are turned fully transparent and fully opaque in alternate time periods. A single signal source may be connected to all the gaps 604 to make them transparent and opaque as required. The opaque-to-transparent and transparent-to-opaque transitions of the gaps 604 may be carried out at a high speed since these transitions are equivalent to black-to-white and white-to-black transitions in liquid crystal displays.

For the light from the user to enter the camera, the backlight 610 is primarily transparent. One system which is a primarily transparent backlight is described in conjunction with FIGS. 7A, 7B, 8, 9, 10 and 11. The alternation between display and capture period is described in conjunction with FIGS. 12A and 12B.

Figure 7A:
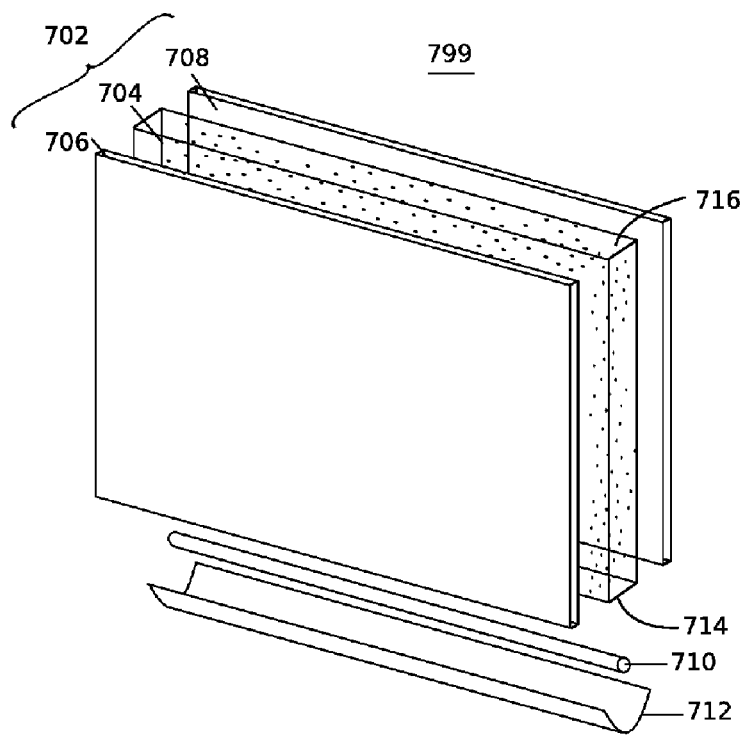
FIG. 7A illustrates a block diagram of an exemplary transparent light source, according to an embodiment of the present invention.

FIG. 7A illustrates a block diagram of an exemplary transparent light source 799 according to an embodiment of the present invention. Light source 799 is primarily transparent and may be constituted of a light guide 702 with a core 704 surrounded by low refractive index cladding sheets 706 and 708. The core 704 includes diffuser, which is a sparse distribution of light dispersing particles. The diffuser in the core is made up of metallic, organic, or other powder, or pigment, which reflects light incident on it. Alternatively, the diffuser in the core may be constituted of small transparent particles or bubbles, which disperse light by refraction, reflection at the boundary, by diffusion inside the particle, or by total internal reflection. Linear light source 710 illuminates the light guide from its edge. Reflector 712 concentrates light from the linear source 710 into the light guide 702. The light from a primary light source 710 is dispersed over the entire surface of the light guide 702 and will exit from its large faces. The light guide 702 is thus primarily transparent and clear when viewed from one of its faces.

Figure 7B:
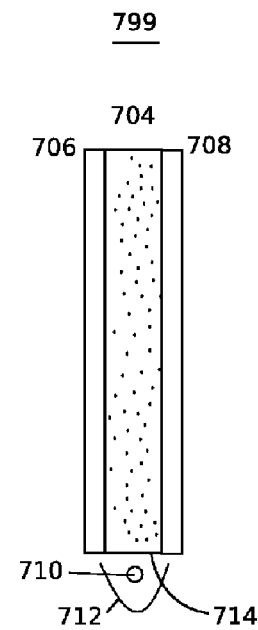
FIG. 7B illustrates a block diagram of the exemplary transparent light source, as viewed from the side, according to an embodiment of the present invention.

FIG. 7B illustrates a block diagram of the exemplary transparent light source 799 as viewed from the side, according to an embodiment of the present invention.

Figure 8:
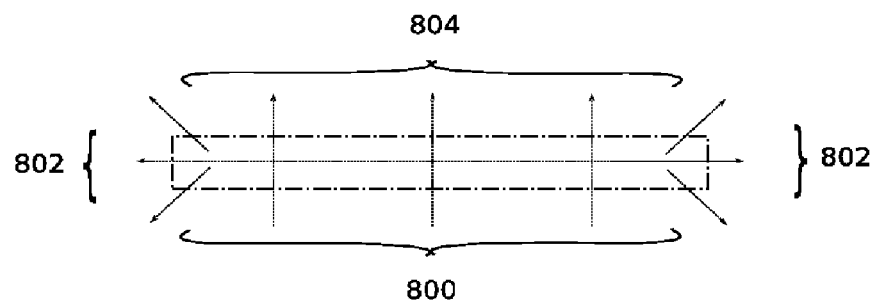
FIG. 8 illustrates a block diagram of an exemplary element of core of exemplary light source in the form of a surface, according to an embodiment of the present invention.

FIG. 8 illustrates a block diagram of an exemplary element 899 of core 704 of exemplary light source in the form of a surface 799, according to an embodiment of the present invention. Core element 899 has the thickness and breadth of the core but has a very small height. Light 800 enters element 899. Some of the light gets dispersed and leaves the light guide as illumination light 802, and the remaining light 804 travels on to the next core element. The power of the light 800 going in is matched by the sum of the powers of the dispersed light 802 and the light continuing to the next core element 804. The fraction of light dispersed 802 with respect to the light 800 entering the element 899 is the photic dispersivity of element 899. The photic dispersivity of element 899 is in direct proportion to the height of element 899. The ratio of the photic dispersivity of element 899 to the height of element 899 is the photic dispersion density of element 899. As the height of element 899 decreases, the photic dispersion density approaches a constant. This photic dispersion density of element 899 bears a certain relationship to the diffuser concentration at the element 899. The relationship is approximated to a certain degree as a direct proportion. The relationship is easy to evaluate by experimentation, and thus, knowing the diffuser concentration of an element allows evaluation of the photic dispersion density of element 899, and vice versa.

As the height of element 899 is reduced, power in the emanating light 802 reduces proportionately. The ratio of power of the emanating light 802 to the height of element 899, which approaches a constant as the height of the element is reduced, is the emanated power density at element 899. The emanated power density at element 899 is the photic dispersion density times the power of the incoming light (i.e. power of light traveling through the element). The gradient of the power of light traveling through the element 899 is the negative of the emanated power density. These two relations give a differential equation. This equation can be represented in the form "dP/dh=−qP=−K" where:

h is the height of a core element from the primary light source edge 714

P is the power of the light being guided through that element;

q is the photic dispersion density of the element; and

K is the emanated power density at that element.

This equation is used to find the emanated power density given the photic dispersion density at each element. This equation is also used to find the photic dispersion density of each element, given the emanated power density. To design a particular light source in the form of a surface with a particular emanated power density, the above differential equation is solved to determine the photic dispersion density at each element of the light source, such as the light source 699. From this, the diffuser concentration at each core element of the core is determined. Such a core is used in a light guide, to give a light source of required emanated energy density over the surface of the light source.

If a uniform concentration of diffuser is used in the core, the emanated power density drops exponentially with height. Uniform emanated power density may be approximated by choosing a minimal diffuser concentration. In this case, the power drop from the edge near the light source (such as edge 714) to the opposite edge 716, is minimal. To reduce the power loss and also improve the uniformity of the emanated power, opposite edge reflects light back into the core. In an alternate embodiment, another light source sources light into the opposite edge.

To achieve uniform illumination, the photic dispersion density and hence the diffuser concentration has to be varied over the length of the core. This can be done using the above methodology. The required photic dispersion density is q=K/(A−hK), where A is the power going into the linear light source 804 and K is the emanated power density at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an exemplary light source, H times K is kept only slightly less than A, so that only a little power is wasted, as well as photic dispersion density is always finite.

Figure 9:
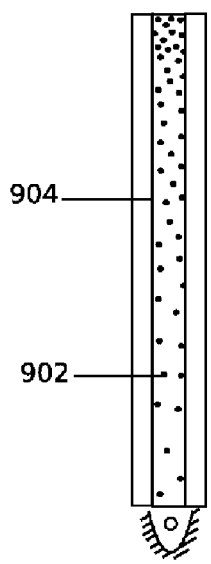
FIG. 9 illustrates a diagram of an exemplary light source in the form of a surface having a varied concentration of diffuser particles, according to an embodiment of the present invention.

FIG. 9 illustrates a diagram of an exemplary light source in the form of a surface 999 having a varied concentration of diffuser particles, according to an embodiment of the present invention. The concentration of the diffuser 902 is varied from sparse to dense from the light source end of linear light source column 904 to the opposite end.

Figure 10:
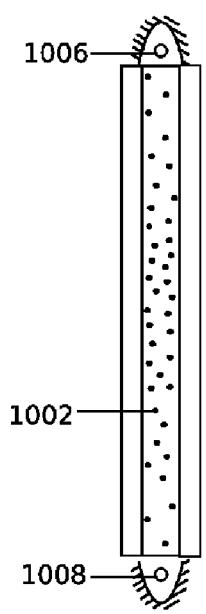
FIG. 10 illustrates an exemplary light source in the form of a surface having two light sources, according to an embodiment of the present invention.

FIG. 10 illustrates an exemplary light source in the form of a surface 1099 having two light sources, according to an embodiment of the present invention. By using two light sources 1006, 1008, high variations in concentration of diffuser 1002 in the core is not necessary. The differential equation provided above is used independently for deriving the emanated power density due to each of the light sources 1006, 1008. The addition of these two power densities provides the total light power density emanated at a particular core element.

Uniform illumination for light source 1099 is achieved by photic dispersion density q=1/sqrt ((h−H/2)^2+C/K^2) where sqrt is the square root function, ^ stands for exponentiation, K is the average emanated power density per light source (numerically equal to half the total emanated power density at each element) and C=A (A−HK).

Figure 11:
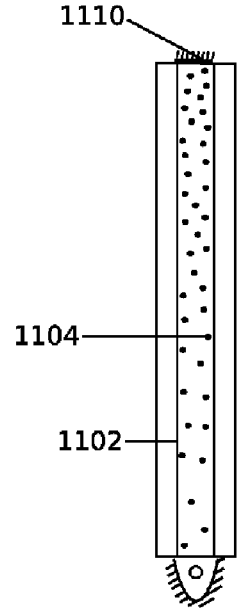
FIG. 11 illustrates a diagram of an exemplary light source in the form of a surface having a mirrored core 1104, according to an embodiment of the present invention.

FIG. 11 illustrates a diagram of an exemplary light source in the form of a surface 1199 having a mirrored core 1104, according to an embodiment of the present invention. By using a mirrored core 1104, high variations in concentration of diffuser 1102 in the core 1104 is not necessary. Top edge of the core 1110 is mirrored, such that it will reflect light back into the core 1104. The photic dispersion density to achieve uniform illumination in light source 1199 is:

$$q=1/\text{sqrt}((h-H)^2+D/K^2)$$

where D=4A (A−HK).

For any system described above (such as the light sources in the form of surfaces 999, 1099 and 1199), the same pattern of emanation will be sustained even if the light source power changes. For example, if the primary light source of light source 999 provides half the rated power, each element of the core will emanate half its rated power. Specifically, a light guide core designed to act as a uniform light source at all power ratings by changing the power of its light source or sources. If there are two light sources, their powers are changed in tandem to achieve this effect.

Figure 12A:
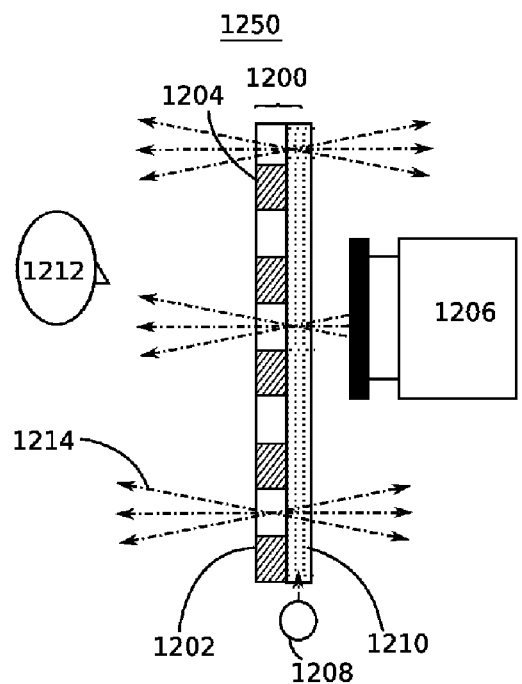
FIG. 12A illustrates a block diagram of an exemplary combined transmissive video display and camera system displaying an image, according to an embodiment of the present invention.

FIG. 12A illustrates a block diagram of an exemplary combined transmissive video display and camera system 1250 during a time period in which it is displaying an image, according to an embodiment of the present invention. Light from the light source 1208 enters the backlight 1210. This light is scattered by the backlight 1210. When the scattered light 1214 is viewed through the pixels 1202 of transmissive display 1200, the image shown on the transmissive display 1200 is perceived. Camera 1206 does not record any image during this time period. The gaps 1204 in the display 1200 are turned opaque.

Figure 12B:
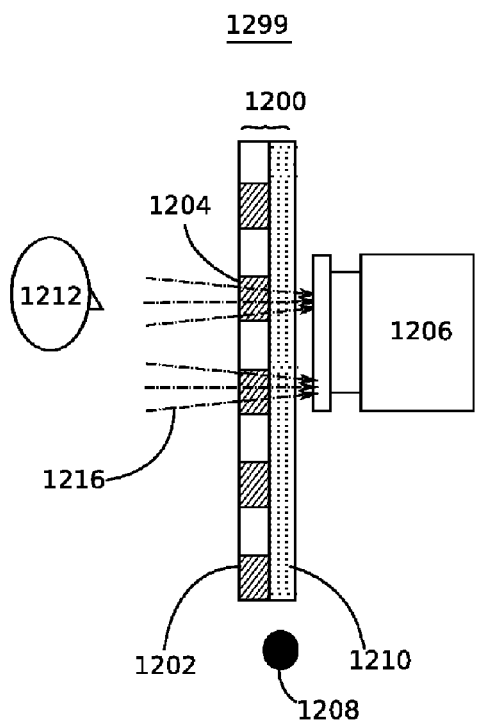
FIG. 12B illustrates a block diagram of an exemplary combined transmissive video display and camera system capturing an image, according to an embodiment of the present invention.

FIG. 12B illustrates a block diagram of an exemplary combined transmissive video display and camera system 1299 during a time period in which it is capturing an image, according to an embodiment of the present invention. Light source 1208 is switched off, so that no light is emanated by the backlight 1210. The gaps 1204 present in the display panel 1200 are turned transparent. The light rays 1216 from the user 1212 pass through the gaps 1204 in the transmissive display 1200 and the backlight 1210, and enter the camera 1206. The camera 1206 records an image during this time period. Since the light source 1208 is switched off, no light scattered by the backlight 1210 enters the camera 1206.

Figure 13:
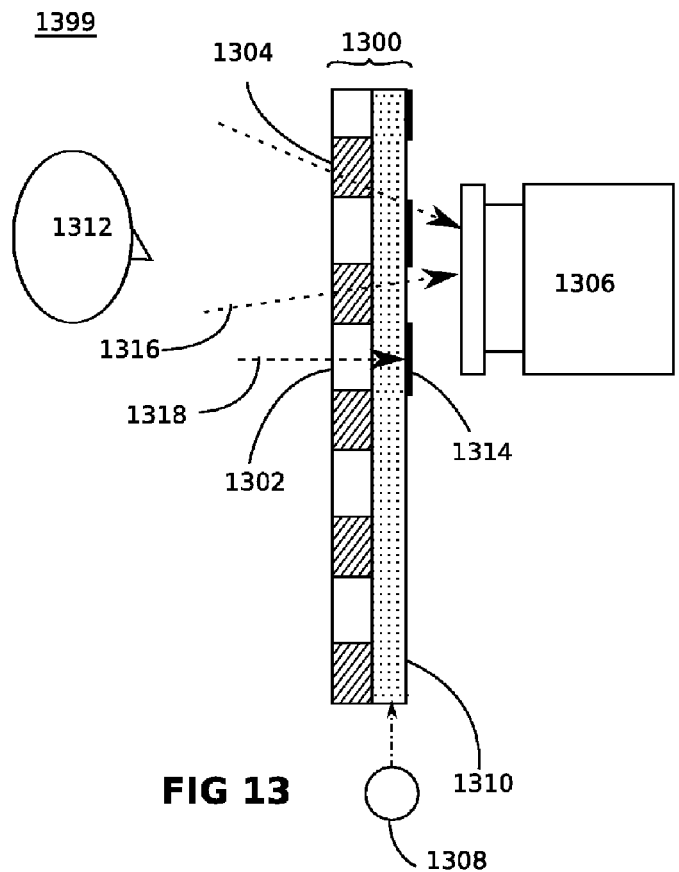
FIG. 13 illustrates a block diagram of a combined transmissive video display and camera system with light barriers, according to an embodiment of the present invention.

FIG. 13 illustrates a block diagram of a combined transmissive video display and camera system 1399 with light barriers, according to an embodiment of the present invention. Light rays 1316 from the user 1312 pass through the gaps 1304 in the display 1399 and the backlight panel 1310 to enter the camera 1306. Light rays 1318 passing through the pixels 1302 are prevented from entering the camera 1306 by light barriers 1314. This prevents contamination of the image captured by the camera 1306 due to varying transparency levels of the display pixels 1302.

In an embodiment, the transmissive display 600 is as described below.

Figure 14:
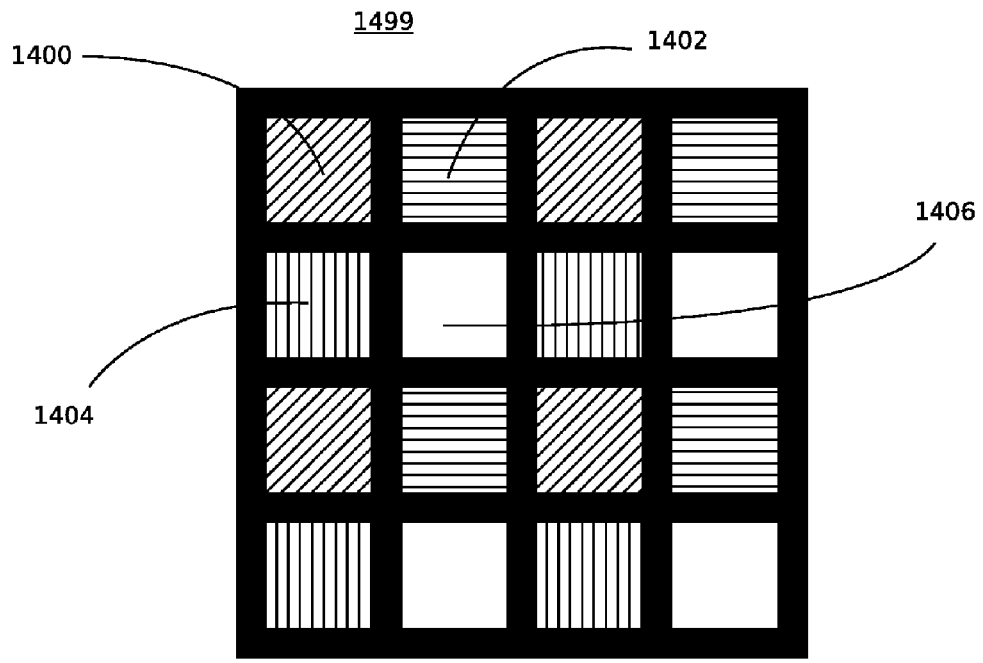
FIG. 14 illustrates a block diagram of an exemplary transmissive display, according to an embodiment of the present invention.

FIG. 14 illustrates a block diagram of an exemplary transmissive display 1499, according to an embodiment of the present invention. The display 1499 is made of pixels 1400, 1402, 1404 and 1406 as shown. The pixels 1400, 1402, 1404 have color filters while 1406 is a pixel without any color filter. The light source switches on and off. The backlight emanates light when the light source is on. The pixel 1406 is turned opaque. When the light source is turned off, the pixel 1406 is made transparent and the camera captures an image. The opaque-to-transparent and transparent-to-opaque transitions of the pixel 1406 may be carried out at a high speed since these transitions are equivalent to black-to-white and white-to-black transitions in liquid crystal displays.

Displays with Multicolored Backlight

A combined video display and camera system comprising a multicolored backlight is described below.

Figure 15A:
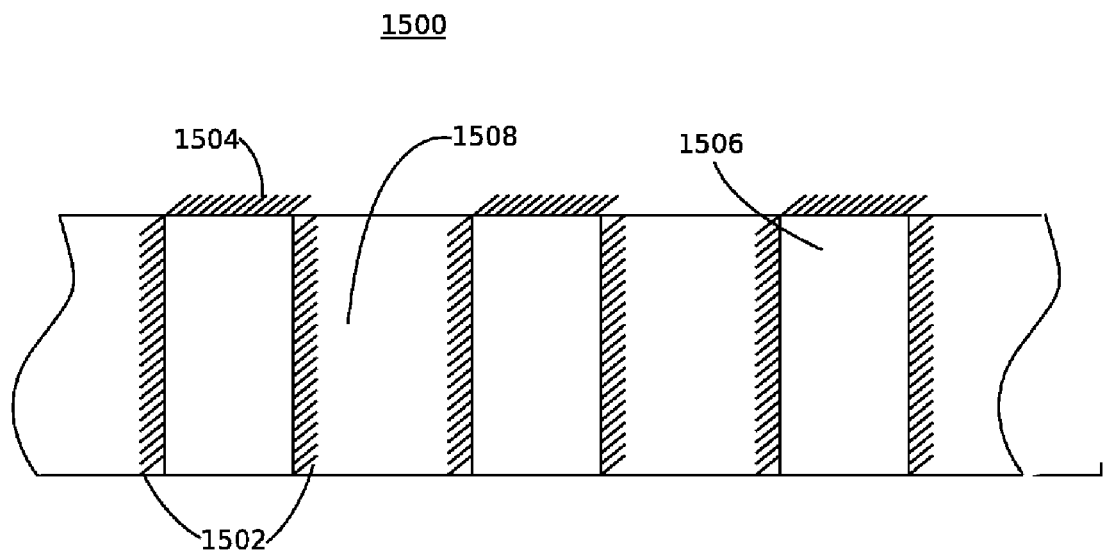
FIG. 15A illustrates a block diagram of a combined video display and camera system using multi-color backlit system, as viewed from the top, according to an embodiment of the present invention.

FIG. 15A illustrates a block diagram of a combined video display and camera system 1500 using multicolored backlight system, as viewed from the top, according to an embodiment of the present invention. The display system 1500 is a multicolored illuminator system such that each pixel illuminator column 1506 of the backlit display is illuminated by light of a particular color. Light coming from the user passes through the columnar gaps 1508 between the illuminator columns 1506 and enters the camera. Back mirror 1504 and side-mirrors 1502 are provided to prevent light from one illuminator column 1506 entering any adjacent illuminator column 1506 or gaps 1508.

Figure 15B:
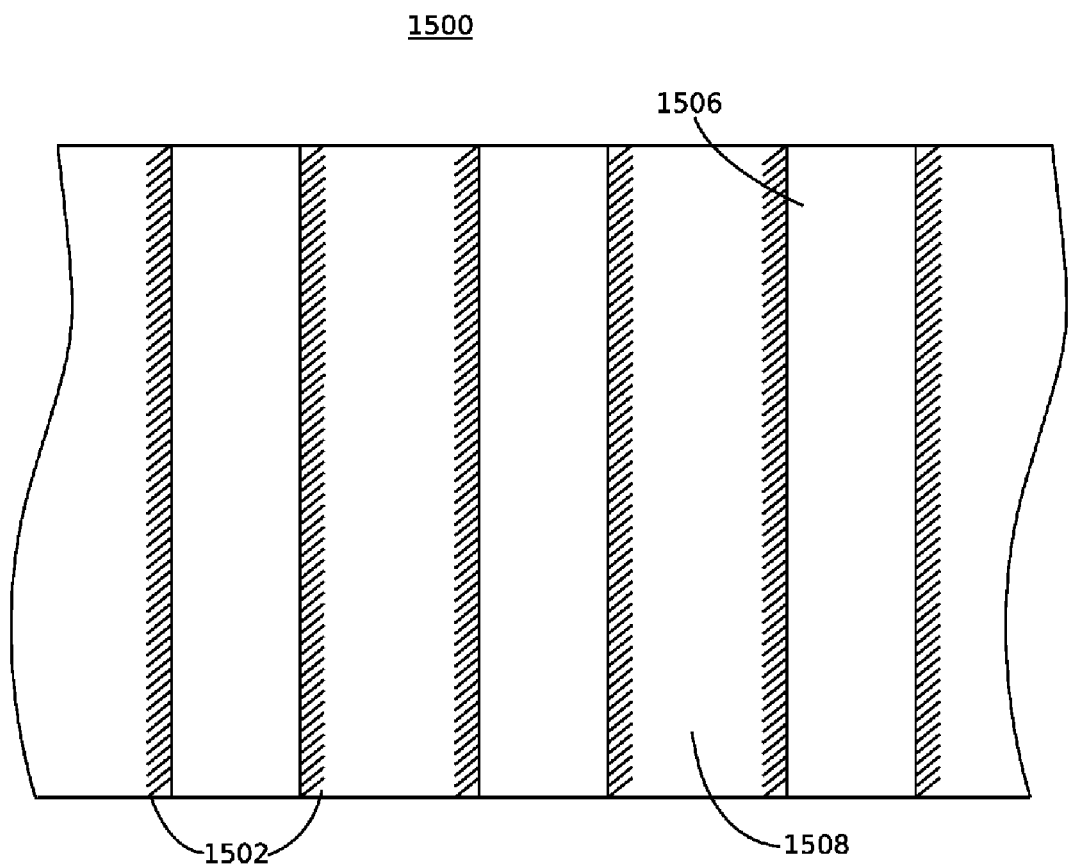
FIG. 15B illustrates a block diagram of a combined video display and camera system using multi-color backlit system as viewed from the front, according to an embodiment of the present invention.

FIG. 15B illustrates a block diagram of a combined video display and camera system 1500 using multicolored backlight system as viewed from the front, according to an embodiment of the present invention.

In an embodiment, a set of multicolored illuminator columns are grouped together between two columnar gaps, as described below.

Figure 16:
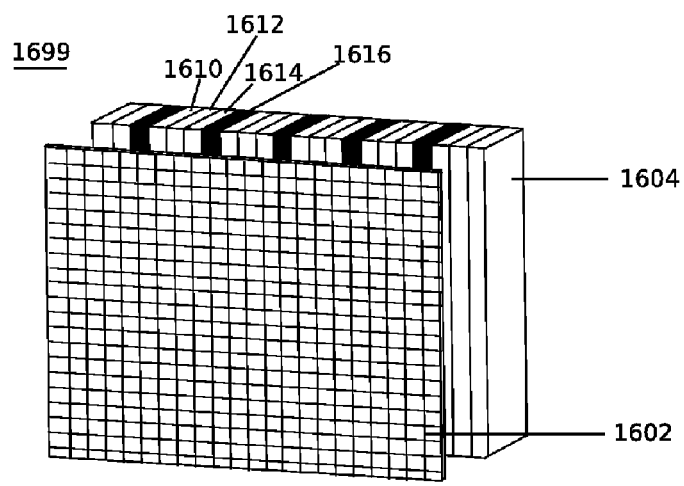
FIG. 16 illustrates a multi-colored backlit system, according to an embodiment of the present invention.

FIG. 16 illustrates a multicolored backlight system 1699, according to an embodiment of the present invention. A multicolored illuminator system comprises a backlight such that each pixel column of the backlit display is illuminated by light of a particular color. The light illuminating different pixel columns may be of different color. The light source 1604 provides illumination for the display. The light source 1604 comprises columnar light sources 1610, 1612, 1614 and columnar gap 1616. Transmissive display 1602 is placed in front of the light source 1604. In an embodiment, the transmissive display 1602 has gaps 1618 corresponding to gaps 1616 in the backlight.

The columnar gap 1616 comprises a column of a transparent material. In an embodiment, the columnar gap is of the same material as that of the columnar light sources.

In an embodiment, the columnar light sources 1610, 1612 and 1614 or illuminator column 1506 are as described below.

Figure 17A:
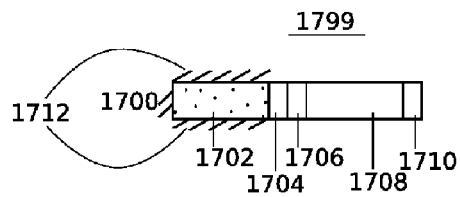
FIG. 17A illustrates a block diagram of an exemplary column of an exemplary multicolor backlit display system as viewed from the top, according to an embodiment of the present invention.

FIG. 17A illustrates a block diagram of an exemplary column 1799 of an exemplary multicolor backlit display system as viewed from the top, according to an embodiment of the present invention. Polarizer 1710, liquid crystal 1708 and polarizer 1706 together form light valve that modulates the intensity of light passing through it. Illuminator column 1702 and cladding sheet 1704 together form a waveguide, illuminator 1702 having higher refractive index than cladding sheet 1704. Illuminator 1702 has small concentration of light dispersing particles. Light inside the waveguide undergoes continuous total internal reflection. Back-mirror 1700 reflects light from the back surface. Side-mirrors 1712 reflect light from the side surfaces. Side-mirrors 1712 prevent light from leaking into the adjacent columns. The mirrors 1700 and 1712 maybe metallic surfaces or Bragg reflectors.

Figure 17B:
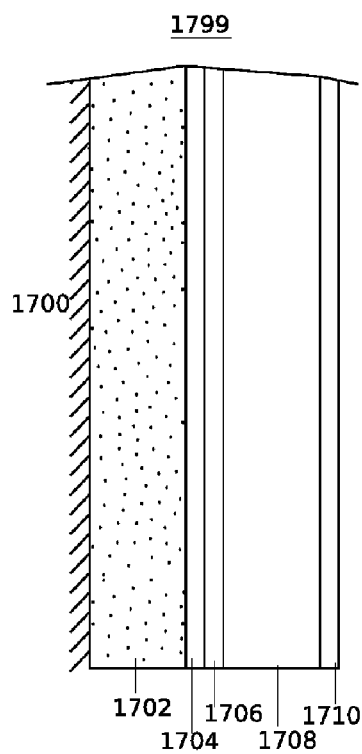
FIG. 17B illustrates a block diagram of an exemplary column of an exemplary multi-colored backlit display system as viewed from the front.

FIG. 17B illustrates a block diagram of an exemplary column 1799 of an exemplary multi-colored backlit display system as viewed from the front, according to an embodiment of the present invention.

Figure 17C:
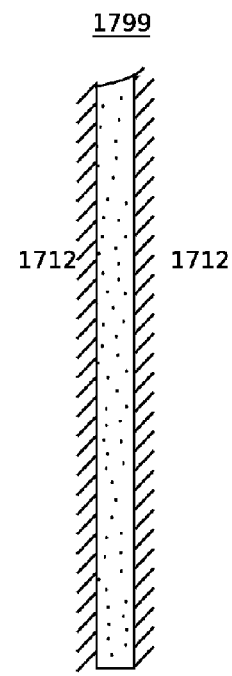
FIG. 17C illustrates a block diagram of an exemplary column of an exemplary backlit display system as viewed from the side, according to an embodiment of the present invention.

FIG. 17C illustrates a block diagram of an exemplary column 1799 of an exemplary backlit display system as viewed from the side, according to an embodiment of the present invention.

Figure 18:
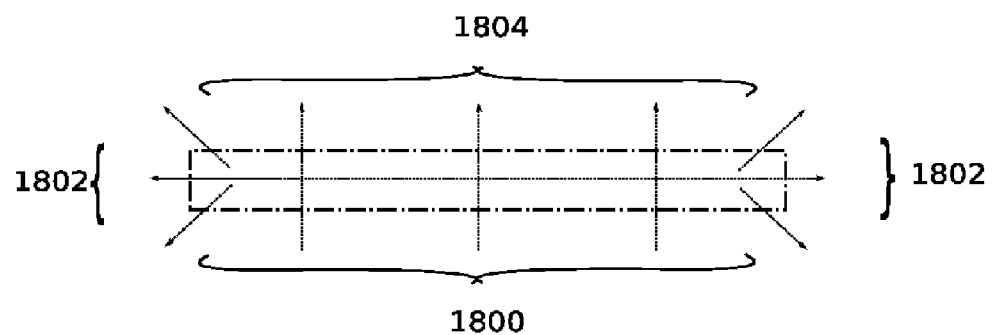
FIG. 18 illustrates a block diagram of an exemplary element of the illuminator column, according to an embodiment of the present invention.

FIG. 18 illustrates a block diagram of an exemplary element 1899 of the illuminator column 1702. The element 1899 of illuminator column 1702 is structurally same as element 899 of core 702 discussed in conjunction with FIG. 8, except that their widths may be different. As the differential equation discussed in conjunction with FIG. 8 depends only on the height of the element from the light source, that equation would also hold for the element 1899.

If a uniform concentration of diffuser is used in the illuminator, the emanated power density drops exponentially with height. To achieve uniform illumination, the photic dispersion density and hence the diffuser concentration has to be varied over the length of illuminator. This can be done using the above methodology. The required photic dispersion density is $q=K/(A-hK)$, where A is the power going into the illuminator column 1702, h is the height of the element 1899 from the light source and K is the emanated power density at each element, a constant number for uniform illumination.

Figure 19:
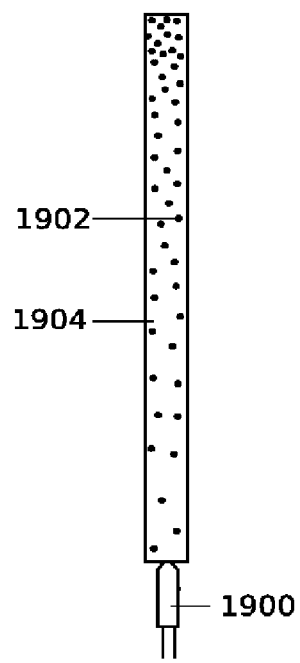
FIG. 19 illustrates a diagram of an illuminator column having a varied concentration of diffuser particles, according to an embodiment of the present invention.

FIG. 19 illustrates a diagram of an illuminator column 1999 having a varied concentration of diffuser particles, according to an embodiment of the present invention. The concentration of the diffuser 1902 is varied from sparse to dense from the end near to the light source 1900 of illuminator column 1904 to the opposite end.

In an embodiment, two light sources are placed at the two ends of the illuminator column. This arrangement would be structurally similar to the one described in conjunction with FIG. 10. Uniform illumination is achieved by photic dispersion density $q=1/\mathrm{sqrt}((h-H/2)^2+C/K^2)$ where sqrt is the square root function, ^ stands for exponentiation, K is the average emanated power density per light source (numerically equal to half the total emanated power density at each element) and C=A (A−HK).

In another embodiment, illuminator column 1999 is mirrored at the end other than the light source end, similar to the arrangement described in conjunction with FIG. 11. The photic dispersion density to achieve uniform illumination in light source is: $q=1/\sqrt{((h-H)^2+D/K^2)}$, where D=4A (A−HK).

Image Correction System

Figure 20:
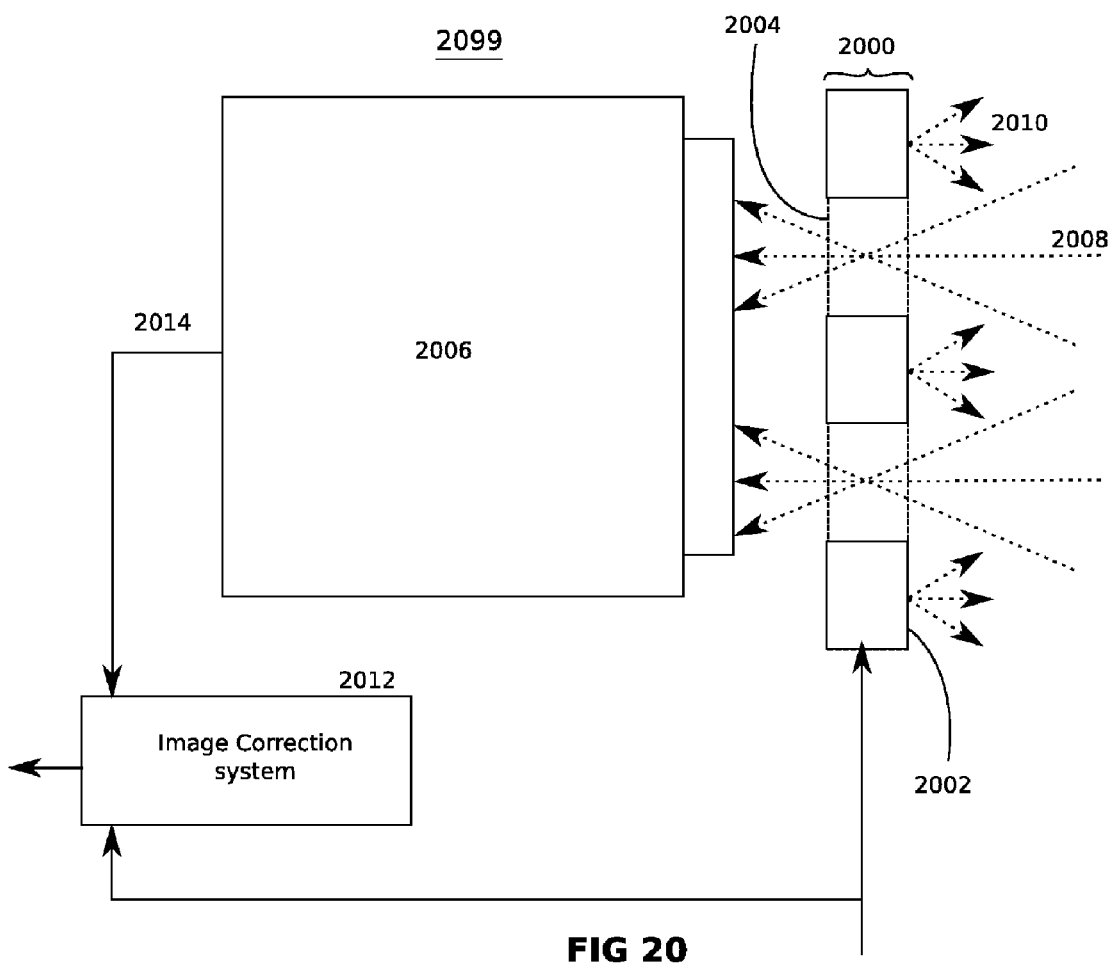
FIG. 20 illustrates a block diagram of a combined video display and camera system along with image correction, according to an embodiment of the present invention.
Figure 21:
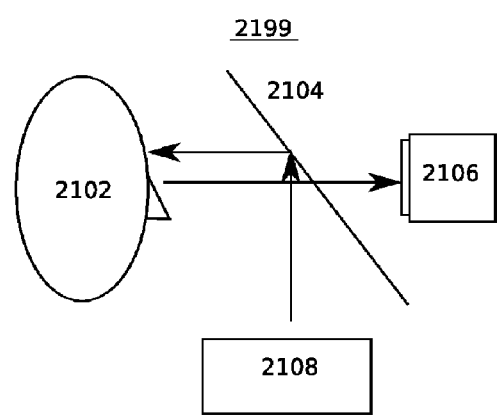
FIG. 21 illustrates a prior art video conferencing system.

FIG. 20 illustrates a block diagram of a combined video display and camera system 2099 along with image correction system, according to an embodiment of the present invention. The display 2000 is made of display pixels 2002 and gaps 2004 as described. Light rays 2010 are emanated by the display pixels. Light rays 2008 from the user pass through the gaps 2004 in the display and enter the camera 2006. The image correction system 2012 corrects the defects in the image captured by the camera 2006 through the gaps 2004 in the display 2000. The camera 2006 is placed very close to the display 2000. If the display 2000 is not turned off completely when the camera 2006 is capturing an image, light from pixels 2002 of the display 2000 affect the image captured by the camera 2006. Furthermore, the pixels 2002 of the display 2000 are out of focus at the image capturing plane of the camera 2006. More than one display pixels 2002 will contribute to the distortion at each captured image pixel. This distortion is a function of the pixel values of the displayed image. In an embodiment, this function is approximated as a linear function that is evaluated by performing experiments whereby a single pixel 2002 on the transmissive screen 2000 is on and all other pixels are off. The distortion due to the single pixel on every pixel of the captured image is recorded. Knowing this distortion for each pixel 2002, the net distortion for any setting of values for the relevant screen pixels 2002 is evaluated. In an alternate embodiment, such a linear function is characterized as a shift-invariant function. Thus various fast convolution methods such as methods based on Fast Fourier Transform may be used to calculate the net distortion from the values of the relevant screen pixels 2002. In an embodiment, the image correction system 2012 rectifies the distortion due to the image depicted on the display 2000 present in the captured image by subtracting the net distortion. The signal 2014 is the signal to be depicted on the display screen 2000. This signal 2014 is provided to the image correction system 2012 for estimating the effect of pixels 2002.

Static elements in the display 2000 such as pixel boundaries, pixel barriers and transistors have a static occluding effect on the intensity of light falling on each pixel of the captured image. The static occlusion of the display can be estimated experimentally, by presenting the camera 2006 with a flat intensity of light. If display 2000 is a transmissive display, all the pixels 2002 are made transparent in order to determine the effect of static elements of the display on the captured image. The effect of the occlusion on the captured image may be nullified by dividing the pixel values of the captured image by the occlusion at each pixel of the captured image. The defects introduced by the static elements of the display on the image captured by the camera 2006 are thus removed.

In an embodiment, display 2000 is a transmissive display. The effect of the occlusion of the pixels 2002 of the transmissive display 2000 on any particular pixel of the captured image is a multiplicative change in intensity. The actual intensity at the particular pixel is multiplied by a function of the occluding pixels. Furthermore, since the occluding pixels are out of focus, more than one occluding pixel will contribute to the occlusion of each captured image pixel. The amount of occlusion suffered by each pixel of the captured image, henceforth called the occlusion map, has a specific relation to the occluding pixels 2002 of the transmissive display 2000. In an embodiment, this relation is approximated as a linear relation that is evaluated by performing experiments whereby a single pixel 2002 on the transmissive screen 2000 is opaque and all other pixels are transparent. The effect of the single pixel on the occlusion map is recorded. Knowing the occlusion map for each pixel 2002, the occlusion map for any setting of values for the relevant screen pixels 2002 is evaluated. In an alternate embodiment, such a linear relation is characterized as a shift-invariant relation. Thus various fast convolution methods such as methods based on Fast Fourier Transform may be used to calculate the occlusion map from the values of the relevant screen pixels 2002. To this dynamic occlusion map, static occlusion introduced due to static elements of the display is added to obtain a composite occlusion map. The map comprises changes due to static as well as dynamic elements. The effect of the occlusion on the captured image may be nullified by dividing the pixel values of the captured image by the occlusion map. The defects introduced by the transmissive display 2000 into the image captured by the camera 2006 are thus removed.

A combined video display and camera system is disclosed. It is understood that the embodiments described herein are for purpose of elucidation and should not be limiting the subject matter of the present patent. Various modifications, uses, substitutions, recombinations, improvements, methods or productions without departing from the scope or spirit of the present invention would be evident to a person skilled in the art.

The invention claimed is:

1. A system comprising,
a transmissive display with gaps in between pixels,
a primarily transparent backlight in the transmissive display, and
at least one camera placed behind the transmissive display, wherein
   at least one camera is configured to capture an image during a capture period and not capture an image during a display period and
   the gaps of the transmissive display become opaque during the display period.

2. The system of claim 1, wherein the transmissive display is a liquid crystal display.

3. The system of claim 1, wherein gaps are situated primarily in front of a camera.

4. The system of claim 1, wherein gaps are situated throughout the entire display.

5. The system of claim 1, wherein a capture period and a display period overlap.

6. The system of claim 1, wherein the backlight in the transmissive display comprises a light guide in the form of a sheet with light diffusing particles within it.

7. The system of claim 1, further comprising light barriers behind the backlight of the transmissive display that block light entering the pixels of the transmissive display from entering a camera, wherein
   the barriers are present at locations corresponding to the pixels of the transmissive display, and
   the barriers are absent at locations corresponding to the gaps in the transmissive display.

8. The system of claim 1, wherein
   the backlight comprises multicolored illuminator columns and gaps, each illuminator column carries light of a particular color, and each illuminator column illuminates a column of pixels of the transmissive display.

9. The system of claim 1, further comprising an image correction system to correct the defects due to the transmissive display.

10. The system of claim 9, wherein the image correction system corrects the defects due to the occlusion from occluding pixels of the transmissive display.

* * * * *